United States Patent
Kidachi et al.

(10) Patent No.: US 10,907,732 B2
(45) Date of Patent: Feb. 2, 2021

(54) SHIFT CONTROL DEVICE

(71) Applicant: SUBARU CORPORATION, Tokyo (JP)

(72) Inventors: Daisuke Kidachi, Tokyo (JP); Mamoru Murakami, Tokyo (JP); Taichi Tsuji, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 285 days.

(21) Appl. No.: 15/996,187

(22) Filed: Jun. 1, 2018

(65) Prior Publication Data

US 2019/0085975 A1   Mar. 21, 2019

(30) Foreign Application Priority Data

Sep. 20, 2017 (JP) .................. 2017-180491

(51) Int. Cl.
| | | |
|---|---|---|
| *F15B 11/16* | (2006.01) | |
| *F16H 61/02* | (2006.01) | |
| *F16H 61/30* | (2006.01) | |
| *F16D 25/10* | (2006.01) | |
| *F16D 48/02* | (2006.01) | |

(52) U.S. Cl.
CPC .............. *F16H 61/30* (2013.01); *F15B 11/16* (2013.01); *F16H 61/0206* (2013.01); *F15B 2211/71* (2013.01); *F16D 25/10* (2013.01); *F16D 25/14* (2013.01)

(58) Field of Classification Search
CPC ...... F16H 61/30; F16H 61/0206; F16H 61/40; F15B 11/16; F15B 2211/71; F15B 2211/6658; F15B 2211/329; F15B 2211/72; F15B 2211/8752; F15B 2211/30565; F15B 21/02; F15B 9/08; F16D 25/14; F16D 25/10
See application file for complete search history.

(56) References Cited

U.S. PATENT DOCUMENTS

| | | |
|---|---|---|
| 5,409,434 A | 4/1995 | Furukawa et al. |
| 5,505,674 A | 4/1996 | Furukawa et al. |

(Continued)

FOREIGN PATENT DOCUMENTS

| | | |
|---|---|---|
| JP | H 05-223156 A | 8/1993 |
| JP | 2008-290575 A | 12/2008 |

(Continued)

OTHER PUBLICATIONS

Japanese Office Action, dated Mar. 19, 2019, in Japanese Application No. 2017-180491 and English Translation thereof.

*Primary Examiner* — David J Hlavka
(74) *Attorney, Agent, or Firm* — McGinn I.P. Law Group, PLLC.

(57) ABSTRACT

A shift control device includes a hydraulic circuit and a control unit. The hydraulic circuit is provided with multiple actuation valves. The control unit is configured to switch positions or states of each of the multiple actuation valves in accordance with a shift position command by a shift operation device. The hydraulic circuit is configured to couples a hydraulic oil supply source to one of travel actuators in an automatic transmission in multiple circuit states where the position or the state of at least one of the multiple actuation valves differs.

13 Claims, 9 Drawing Sheets

(56) References Cited

U.S. PATENT DOCUMENTS

| | | | | |
|---|---|---|---|---|
| 7,954,394 | B2* | 6/2011 | Yoshioka | F16H 63/3483 |
| | | | | 74/335 |
| 9,759,314 | B2* | 9/2017 | Tsuchida | F16H 61/12 |
| 9,958,066 | B2* | 5/2018 | Ichikawa | F16H 61/22 |
| 2010/0099537 | A1* | 4/2010 | Maten | F16H 61/688 |
| | | | | 477/130 |
| 2013/0220052 | A1 | 8/2013 | Kinoshita et al. | |

FOREIGN PATENT DOCUMENTS

| | | |
|---|---|---|
| JP | 2013-177953 A | 9/2013 |
| JP | 2014-055624 A | 3/2014 |

* cited by examiner

SHIFT CONTROL DEVICE

CROSS-REFERENCE TO RELATED APPLICATIONS

The present application claims priority from Japanese Patent Application No. 2017-180491 filed on Sep. 20, 2017, the entire contents of which are hereby incorporated by reference.

BACKGROUND

1. Technical Field

The present invention relates to a shift control device used for a vehicle.

2. Related Art

A vehicle is provided with a transmission having a hydraulic circuit to which various actuators such as a clutch are coupled. A shift control device is incorporated in the transmission, and the shift control device switches hydraulic pressure supply paths, that is, the actuators to which a hydraulic pressure is supplied in accordance with a range switching operation to a shift lever.

In recent years, as disclosed in Japanese Unexamined Patent Application Publication (JP-A) No. 2008-290575, for instance, a shift control device of a shift-by-wire type has been widespread. The shift control device of the shift-by-wire type controls an electric actuator in accordance with the range switching operation, and a switching valve that is provided in the hydraulic circuit is switched through the control of this electric actuator.

SUMMARY OF THE INVENTION

An aspect of the present invention provides a shift control device according to an aspect of the present invention including: a hydraulic circuit provided with multiple actuation valves; and a control unit configured to switch positions or states of each of the multiple actuation valves in accordance with a shift position command by a shift operation device. The hydraulic circuit is configured to couple a hydraulic oil supply source to one of travel actuators in an automatic transmission in multiple circuit states where the position or the state of at least one of the multiple actuation valves differs.

An aspect of the present invention provides a shift control device according to an aspect of the present invention including: a hydraulic circuit provided with multiple actuation valves; and circuitry configured to switch positions or states of each of the multiple actuation valves in accordance with a shift position command by a shift operation device. The hydraulic circuit is configured to couple a hydraulic oil supply source to one of travel actuators in an automatic transmission in multiple circuit states where the position or the state of at least one of the multiple actuation valves differs.

DETAILED DESCRIPTION

Figure 1A:
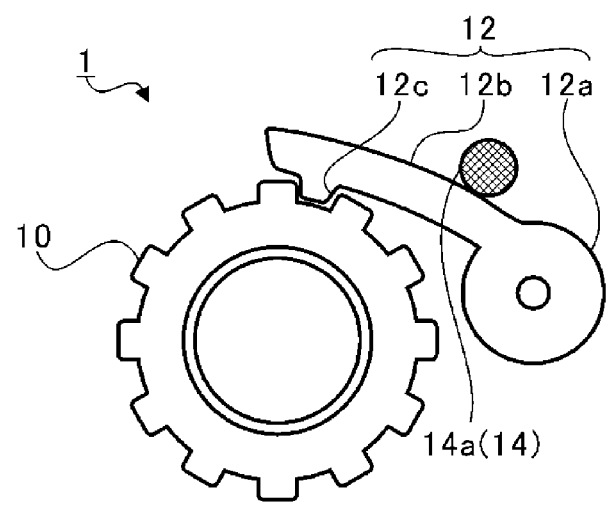
FIGS. 1A and 1B are schematic views of a parking lock mechanism.

A preferred example of the present invention will now be described in detail with reference to the accompanying drawings. Note that the following description is directed to an illustrative example of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the disclosure are optional and may be provided on an as-needed basis. Dimensions, materials, specific values, and the like indicated in such an example are merely instances for facilitating understanding of the present invention and do not limit the present invention unless otherwise specified. In the present specification and drawings, elements having substantially the same function and configuration are denoted by the same reference numeral and redundant explanations are omitted. Elements not directly related to the present invention are not illustrated.

When malfunction occurs to the vehicle, the vehicle has to be evacuated to a safe place. However, in a shift control device of a shift-by-wire type, there is a case where the switching valve cannot be switched due to malfunction of the electric actuator, which prevents the evacuation of the vehicle to the safe place.

It is desirable to provide a shift control device capable of reliably evacuating a vehicle to a safe place.

A shift control device of the example is provided in a vehicle on which an automatic transmission (AT) is mounted. The shift control device switches hydraulic pressure supply paths in accordance with a range switching operation of a shift lever. A description will herein be made on a shift control device of a shift-by-wire type that controls an electric valve in accordance with the range switching operation. The shift control device of the present example includes a parking lock mechanism that is switched between a restriction state of restricting rotation of an axle and a release state of permitting the rotation of the axle. Hereinafter, a schematic configuration of the parking lock mechanism will be described first. Next, the shift control device will be described in detail.

Figure 1B:
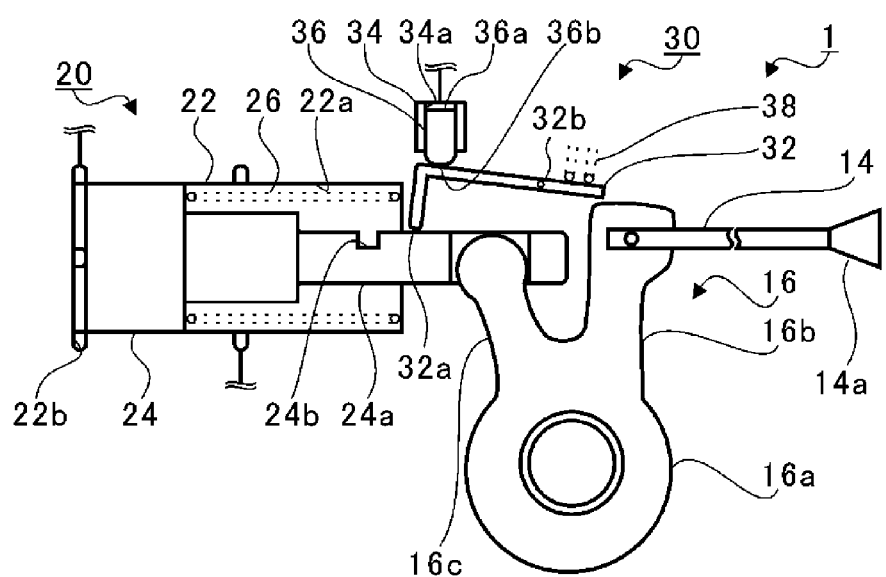
Figure 2A:
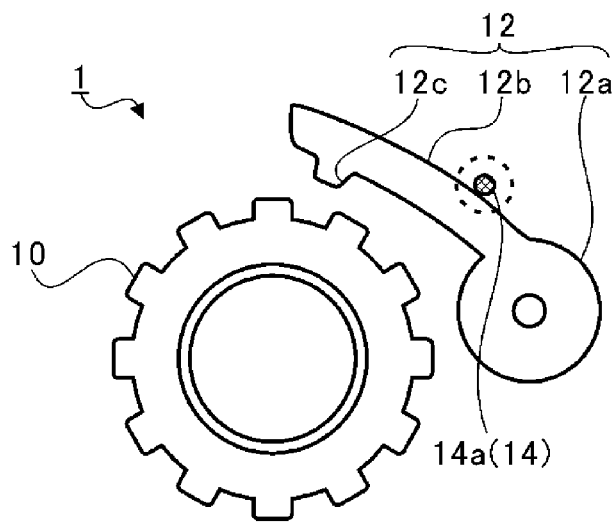
FIGS. 2A and 2B are views of a release state of the parking lock mechanism.
Figure 2B:
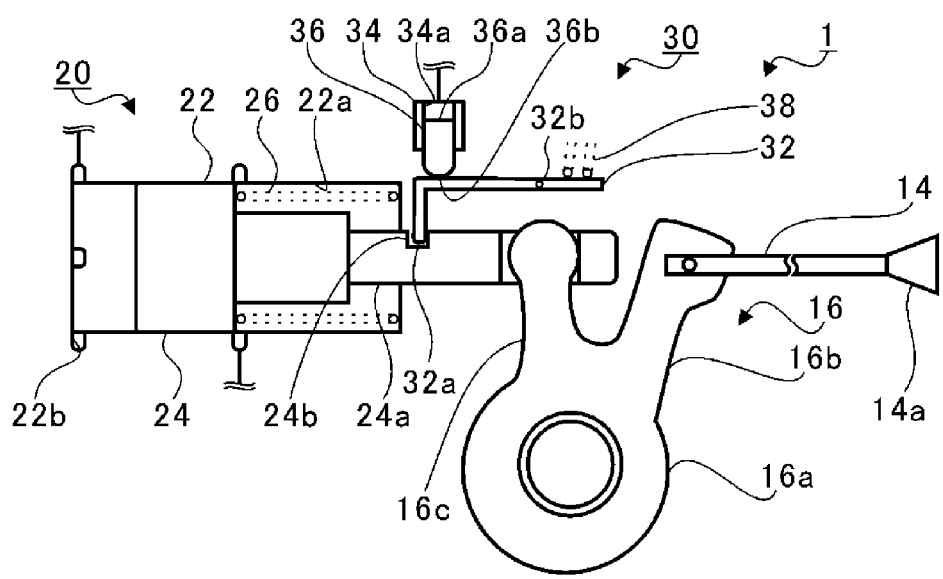

FIGS. 1A and 1B are schematic views of a parking lock mechanism 1. FIGS. 2A and 2B are views of a release state of the parking lock mechanism 1. As illustrated in FIG. 1A, the parking lock mechanism 1 includes a parking gear 10 and a parking pawl 12. The parking gear 10 is provided on an output shaft of the transmission. The parking gear 10 is spline-fitted to the output shaft and integrally rotates with the output shaft, for instance. The parking gear 10 only has to integrally rotate with the axle of the vehicle and may be provided on the axle, for instance.

The parking pawl 12 includes a base portion 12a and an arm portion 12b that is stretched from the base portion 12a. A pawl portion 12c that meshes with the parking gear 10 is provided on a tip side of the arm portion 12b. The base portion 12a is supported in a freely rotatable manner, and an urging force in a clockwise direction is constantly applied to the parking pawl 12 by an unillustrated spring. As illustrated in FIG. 1A and FIG. 2A, this parking pawl 12 is swung about the base portion 12a as an axis by a parking rod 14.

The parking rod 14 is provided in a freely movable manner in an axial direction, and as illustrated in FIG. 1B, a slide cam 14a is provided at a tip thereof. The slide cam 14a is formed in a conical shape, a diameter of which is gradually increased toward a tip. As illustrated in FIG. 1A, the slide cam 14a is adjacent to the arm portion 12b of the parking pawl 12. In a state where the parking rod 14 has moved to a base end side, as indicated by cross-hatching in FIG. 1A, the arm portion 12b of the parking pawl 12 is in contact with a tip side of the slide cam 14a. In this state, the parking pawl 12 is pressed in a counterclockwise direction by the slide cam 14a, the pawl portion 12c meshes with the parking gear 10, and rotation of the parking gear 10 is thereby restricted.

Meanwhile, when the parking rod 14 moves to the tip side, as illustrated in FIG. 2A, the arm portion 12b of the parking pawl 12 is swung in the clockwise direction by the urging force of the spring. In this state, the pawl portion 12c is separated from the parking gear 10, and the rotation of the parking gear 10 is permitted. Just as described, the parking pawl 12 is swung by an outer dimensional difference of the slide cam 14a, and the rotation of the parking gear 10 is thereby restricted or permitted.

A parking plate 16 is coupled to the base end side of the parking rod 14. As illustrated in FIG. 1B, the parking plate 16 includes a shaft portion 16a through which an unillustrated shaft is inserted. The parking plate 16 is supported such that the shaft portion 16a is freely rotatable about the shaft. The parking plate 16 is provided with a transmission portion 16b and a projection 16c that are radially projected from the shaft portion 16a. The base end side of the parking rod 14 described above is coupled to the transmission portion 16b.

The parking lock mechanism 1 includes an actuation mechanism 20. The actuation mechanism 20 includes a cylinder 22 and a piston 24 that is provided in a freely slidable manner in the cylinder 22. The piston 24 is provided with a piston rod 24a. An internal space of the cylinder 22 is divided by the piston 24 into a rod chamber 22a located on the piston rod 24a side and a hydraulic chamber 22b located on an opposite side of the piston rod 24a. In the rod chamber 22a, an urging member 26 that includes a spring and the like is provided. The urging member 26 constantly urges the piston 24 to the hydraulic chamber 22b side.

A tip of the piston rod 24a is projected from the rod chamber 22a even in a state where the piston 24 is located closest to the hydraulic chamber 22b side. The tip of the piston rod 24a has a fitting hole, and a tip of the projection 16c of the parking plate 16 is fitted to this fitting hole.

The parking lock mechanism 1 includes a holding mechanism 30. The holding mechanism 30 includes a holding pin 32, a cylinder 34, a holding member 36, and a spring 38. The holding pin 32 is a rod-shaped member, a tip 32a side of which is bent at a substantially right angle, and a support 32b is supported in a freely rotatable manner. The holding member 36 is constructed of a valve body that is provided in a freely slidable manner in an actuation chamber 34a of the cylinder 34. In the holding member 36, a base end surface 36a faces the actuation chamber 34a, and, when hydraulic oil is supplied to the actuation chamber 34a, the base end surface 36a is pressed and moves to a tip 36b side. The tip 36b of the holding member 36 is in contact with the holding pin 32. When the holding member 36 moves to the tip 36b side, an urging force that causes rotation in the counterclockwise direction in FIG. 1B is applied to the holding pin 32. The spring 38 applies an urging force that causes rotation in the clockwise direction in FIG. 1B to the holding pin 32.

The tip 32a of the holding pin 32 is fitted to a locking groove 24b provided in the piston rod 24a. As illustrated in FIG. 2B, in the piston rod 24a, the locking groove 24b is provided at a position that is exposed to the outside of the cylinder 22 in a state where the piston 24 moves most to the rod chamber 22a side. In the state where the piston 24 moves most to the rod chamber 22a side, the locking groove 24b is located on a rotation locus of the tip 32a of the holding pin 32.

For instance, in the case where a shift position is in a parking range, the parking lock mechanism 1 is brought into a restriction state illustrated in FIGS. 1A and 1B. In this restriction state, as illustrated in FIG. 1B, the piston 24 is located closest to the hydraulic chamber 22b side, and the piston rod 24a is brought into a state of being most immersed in the cylinder 22. In this state, as illustrated in FIG. 1A, the pawl portion 12c of the parking pawl 12 meshes with the parking gear 10. In the state where the pawl portion 12c meshes with the parking gear 10, the rotation of the parking gear 10 is restricted, and thus the rotation of the axle is restricted.

Meanwhile, in the case where the shift position is in a drive range, for instance, the parking lock mechanism 1 is brought into a release state illustrated in FIGS. 2A and 2B. In this release state, as illustrated in FIG. 2B, the piston 24 is located closest to the rod chamber 22a side, and the piston rod 24a is brought into the most projected state. When the piston rod 24a is projected, the projection 16c is pressed, and the parking plate 16 rotates in the clockwise direction in the drawing. When the parking plate 16 rotates, the parking rod 14, which is provided in the transmission portion 16b, moves. When the parking rod 14 moves, as illustrated in FIG. 2A, the parking pawl 12 is swung (tilted). In this state, the pawl portion 12c of the parking pawl 12 is separated from the parking gear 10. In the state where the pawl portion 12c is separated from the parking gear 10, the rotation of the parking gear 10, that is, the rotation of the axle is permitted.

As it has been described so far, the parking lock mechanism 1 is switched between the restriction state of restricting the rotation of the axle and the release state of permitting the rotation of the axle. In the present example, the parking lock mechanism 1 is switched between the restriction state and the release state by the shift control device that switches the hydraulic pressure supply paths to each actuator in the transmission in accordance with the range switching operation. The shift control device will hereinafter be described in detail.

Figure 3:
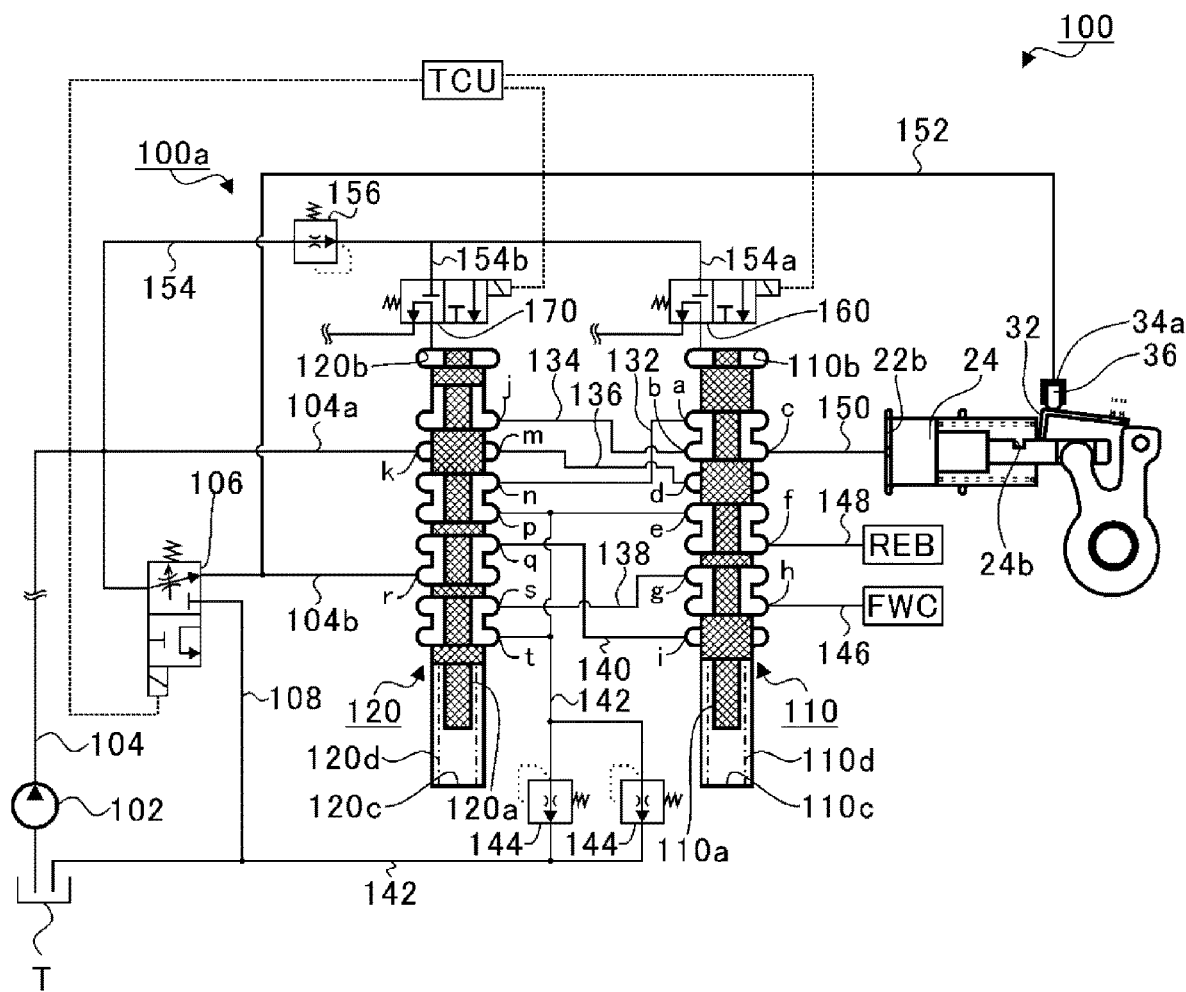
FIG. 3 is a view illustrating a shift control device of the present example.

FIG. 3 is a view illustrating a shift control device 100 of the present example. A description will herein be made on a case where the shift control device 100 is applied to a forward-reverse travel switching mechanism in a continuously variable transmission (CVT). The shift control device 100 includes a hydraulic circuit 100a that couples multiple supply targets to a pump 102 as a hydraulic oil supply source. Here, as the hydraulic oil supply targets, travel actuators (a forward clutch FWC and a reverse brake REB) of the forward-reverse travel switching mechanism and the hydraulic chamber 22b (the piston 24) and the actuation chamber 34a (the holding member 36) of the parking lock mechanism 1 are coupled to the hydraulic circuit 100a.

In the pump 102, an intake port is coupled to a tank T, and a discharge port is coupled to a supply oil passage 104. In the supply oil passage 104, an unillustrated regulator is provided to regulate a pump pressure at a predetermined pressure, and the regulated pump pressure is then delivered in the hydraulic circuit 100a. In the hydraulic circuit 100a, the supply oil passage 104 is branched into a first supply oil passage 104a and a second supply oil passage 104b.

The first supply oil passage 104a and the second supply oil passage 104b are coupled to a first switching valve 110 (an actuation valve) and a second switching valve 120 (an actuation valve) that are provided in the hydraulic circuit 100a. The first switching valve 110 and the second switching valve 120 each switch coupling paths between the pump 102 and the hydraulic oil supply targets (the forward clutch FWC, the reverse brake REB, and the hydraulic chamber 22b) in accordance with the shift position of the shift lever.

The first switching valve 110 includes: a spool valve 110a that is provided in a freely slidable manner in a spool hole; a pilot chamber 110b that one end of the spool valve 110a faces; and a spring chamber 110c that the other end of the spool valve 110a faces. The spring chamber 110c is provided with a spring 110d that urges the spool valve 110a to the pilot chamber 110b side.

In the case where a pilot pressure is not applied to the pilot chamber 110b, the spool valve 110a is held at an illustrated initial position (a second position) by an urging force of the spring 110d. When the pilot pressure is applied to the pilot chamber 110b, the spool valve 110a moves to the spring chamber 110c side against the urging force of the spring 110d and is held at a switch position (a first position).

As illustrated in the drawing, the spool hole of the first switching valve 110 has nine ports (a, b, c, d, e, f, g, h, i in the drawing), each of which is coupled to the hydraulic oil passage. Each of the ports is opened/closed in accordance with a position of a land portion provided in the spool valve 110a.

The second switching valve 120 includes a spool valve 120a provided in a freely slidable manner in a spool hole, a pilot chamber 120b that one end of the spool valve 120a faces, and a spring chamber 120c that the other end of the spool valve 120a faces. The spring chamber 120c is provided with a spring 120d that urges the spool valve 120a to the pilot chamber 120b side.

In the case where the pilot pressure is not applied to the pilot chamber 120b, the spool valve 120a is held at an illustrated initial position (second position) by an urging force of the spring 120d. When the pilot pressure is applied to the pilot chamber 120b, the spool valve 120a moves to the spring chamber 120c side against the urging force of the spring 120d and is held at a switch position (a first position).

As illustrated in the drawing, the spool hole of the second switching valve 120 has nine ports (j, k, m, n, p, q, r, s, t in the drawing) that are coupled to the hydraulic oil passage. Each of the ports is opened/closed in accordance with a position of a land portion provided in the spool valve 120a.

The first supply oil passage 104a is coupled to the port k of the second switching valve 120. The second supply oil passage 104b is coupled to the port r of the second switching valve 120. The second supply oil passage 104b is provided with a linear valve 106 (an actuation valve, a control valve) as a hydraulic control valve. The linear valve 106 is electrically controlled by a transmission control unit TCU (a control unit). The transmission control unit TCU calculates a required hydraulic pressure for each of the hydraulic oil supply targets and controls an opening degree of the linear valve 106 in accordance with a calculation result.

Note that the opening degree of the linear valve 106 is linearly controlled in accordance with a current value. Here, the linear valve 106 is brought into a fully opened state in an unenergized state and maximizes an opening degree of the second supply oil passage 104b (normal open). When the current value becomes equal to or larger than a specified value, the linear valve 106 shuts off the second supply oil passage 104b. At this time, the linear valve 106 communicates a downstream side of the linear valve 106 in the second supply oil passage 104b with the tank T via a tank passage 108.

The hydraulic circuit 100a includes: a first coupling oil passage 132 that couples the port a of the first switching valve 110 and the port n of the second switching valve 120; a second coupling oil passage 134 that couples the port b of the first switching valve 110 and the port j of the second switching valve 120; a third coupling oil passage 136 that couples the port d of the first switching valve 110 and the port m of the second switching valve 120; a fourth coupling oil passage 138 that couples the port g of the first switching valve 110 and the port s of the second switching valve 120; and a fifth coupling oil passage 140 that couples the port i of the first switching valve 110 and the port q of the second switching valve 120.

The hydraulic circuit 100a further includes a drain oil passage 142. The drain oil passage 142 couples the port e of the first switching valve 110, the ports p, t of the second switching valve 120, and the tank T. In the drain oil passage 142, multiple (two in here) pressure holding valves 144 are provided in parallel.

When a pressure of the drain oil passage 142 (on an upstream side of the pressure holding valves 144) is lower than a predetermined pressure, the pressure holding valves 144 are held in closed states and block the communication between the tank T and each of the oil passages in the hydraulic circuit 100a. Meanwhile, when the pressure of the drain oil passage 142 (on the upstream side of the pressure holding valves 144) becomes equal to or higher than the predetermined pressure, the pressure holding valves 144 are brought into opened states and communicate between the tank T and each of the oil passages in the hydraulic circuit 100a. That is, each of the pressure holding valves 144 holds the pressure of the drain oil passage 142 (on the upstream side of the pressure holding valve 144) at the predetermined pressure.

Note that a configuration of each of the pressure holding valves 144 is not particularly limited. However, each of the pressure holding valves 144 is preferably a one-way valve (a check valve, a non-return valve) that only permits a flow of the hydraulic oil in one direction from the first switching valve 110 side and the second switching valve 120 side to the tank T side.

The hydraulic circuit 100a includes: an actuator oil passage 146 that couples the port h of the first switching valve 110 and the forward clutch FWC of the forward-reverse travel switching mechanism; an actuator oil passage 148 that couples the port f of the first switching valve 110 and the reverse brake REB of the forward-reverse travel switching mechanism; and an actuator oil passage 150 that couples the port c of the first switching valve 110 and the hydraulic chamber 22b of the parking lock mechanism 1.

The hydraulic circuit 100a includes a transmission oil passage 152. The transmission oil passage 152 couples the downstream side of the linear valve 106 in the second supply oil passage 104b and the actuation chamber 34a of the parking lock mechanism 1.

The hydraulic circuit 100a is provided with a pilot oil passage 154. The pilot oil passage 154 is coupled to the supply oil passage 104 in a manner to be parallel with the first supply oil passage 104a and the second supply oil passage 104b. The pilot oil passage 154 is provided with a pressure reduction valve 156 that reduces the pressure of the hydraulic oil to a specified pressure. A downstream side of the pressure reduction valve 156 in the pilot oil passage 154 is branched in parallel into a first pilot oil passage 154a and a second pilot oil passage 154b.

The first pilot oil passage 154a couples the pilot oil passage 154 and the pilot chamber 110b of the first switching valve 110. The second pilot oil passage 154b couples the pilot oil passage 154 and the pilot chamber 120b of the second switching valve 120. Accordingly, after the pressure of the hydraulic oil that is discharged from the pump 102 is reduced to the predetermined pressure by the pressure reduction valve 156, the hydraulic oil is delivered to the pilot chambers 110b, 120b.

A first control valve 160 is provided in the first pilot oil passage 154a, and a second control valve 170 is provided in the second pilot oil passage 154b. Each of the first control valve 160 and the second control valve 170 is configured as an electromagnetic solenoid valve and is controlled by the transmission control unit TCU. In an unenergized state, the first control valve 160 is held at an illustrated close position (normal close). At this close position, the first control valve 160 blocks the communication between the pump 102 and the pilot chamber 110b and couples the pilot chamber 110b to the tank T. Meanwhile, in an energized state, the first control valve 160 is held at an open position on a right side in the drawing. At the open position, the first control valve 160 communicates between the pump 102 and the pilot chamber 110b and applies the pilot pressure to the pilot chamber 110b.

Similarly, in an unenergized state, the second control valve 170 is held at an illustrated close position (normal close). At this close position, the second control valve 170 blocks the communication between the pump 102 and the pilot chamber 120b and couples the pilot chamber 120b to the tank T. Meanwhile, in an energized state, the second control valve 170 is held at an open position on a right side in the drawing. At the open position, the second control valve 170 communicates between the pump 102 and the pilot chamber 120b and applies the pilot pressure to the pilot chamber 120b.

In the case where the pilot pressure is not applied to the pilot chamber 110b, the first switching valve 110 is held at an illustrated initial position. Accordingly, in the case where the first control valve 160 is in the unenergized state, the first switching valve 110 is held at the initial position. Meanwhile, in the case where the pilot pressure is applied to the pilot chamber 110b, the first switching valve 110 moves downward in the drawing and is held at a switch position. Accordingly, in the case where the first control valve 160 is in the energized state, the first switching valve 110 is held at the switch position.

Similarly, in the case where the pilot pressure is not applied to the pilot chamber 120b, the second switching valve 120 is held at an illustrated initial position. Accordingly, in the case where the second control valve 170 is in the unenergized state, the second switching valve 120 is held at the initial position. Meanwhile, in the case where the pilot pressure is applied to the pilot chamber 120b, the second switching valve 120 moves downward in the drawing and is held at a switch position. Accordingly, in the case where the second control valve 170 is in the energized state, the second switching valve 120 is held at the switch position.

As it has been described so far, the shift control device 100 includes the first control valve 160 and the second control valve 170, which are actuated by the energization, for the first switching valve 110 and the second switching valve 120, respectively. The first switching valve 110 and the second switching valve 120 are switched between the initial positions and the switch positions in accordance with energized conditions of the first control valve 160 and the second control valve 170.

Next, a shift control device 100 with the above configuration will be described. The transmission control unit TCU switches each of the first switching valve 110 and the second switching valve 120 between the initial position and the switch position in accordance with the shift position of the shift lever. The transmission control unit TCU also controls the opening degree of the linear valve 106 in accordance with the shift position of the shift lever.

Figure 4:
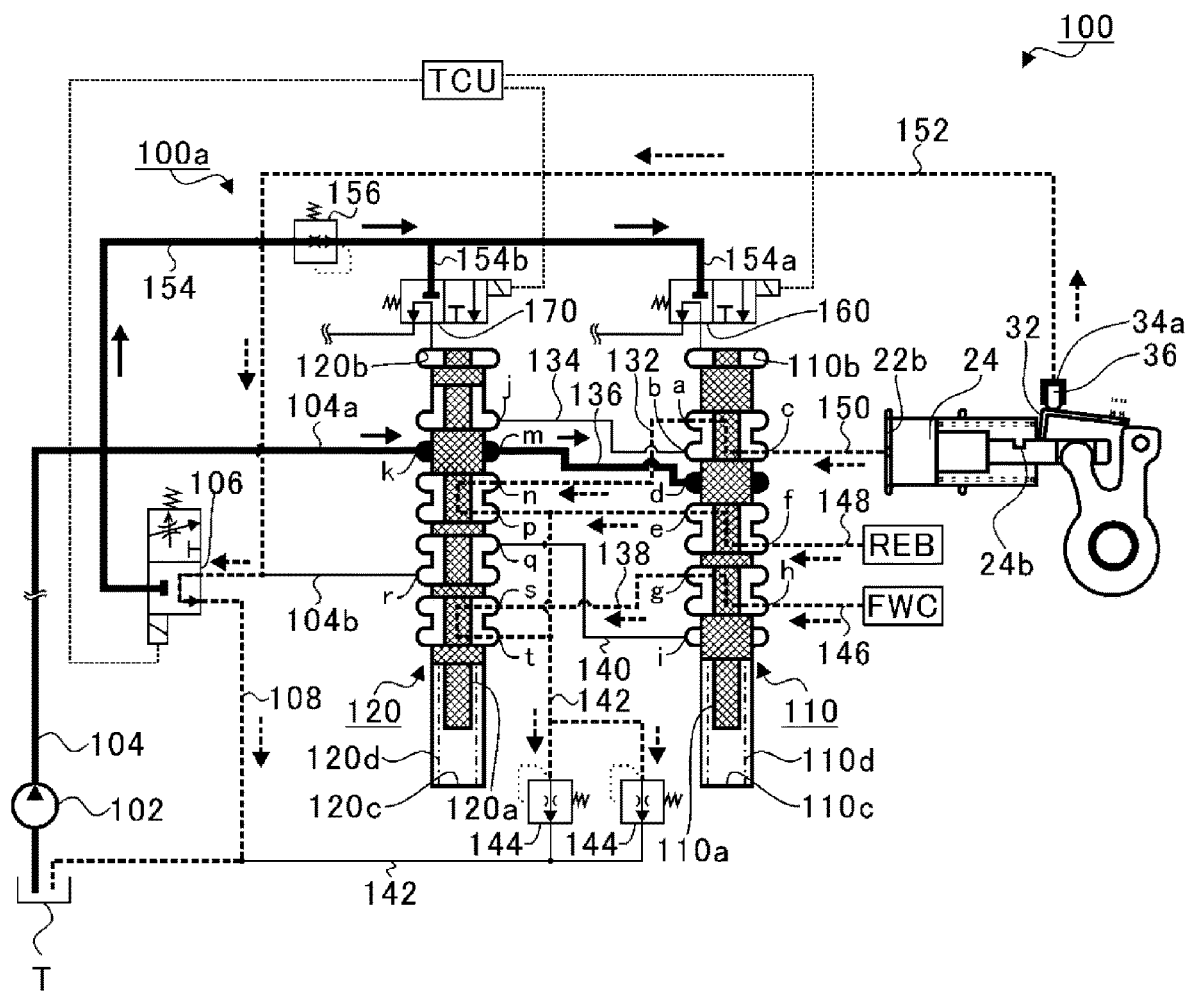
FIG. 4 is a view of a circuit state of the shift control device that corresponds to a parking range.

FIG. 4 is a view of a circuit state of the shift control device 100 that corresponds to the parking range. In the case where the shift position of the shift lever is in the parking range, the transmission control unit TCU controls the first control valve 160 and the second control valve 170 to be unenergized and holds the first control valve 160 and the second control valve 170 at the illustrated close positions. In addition, the transmission control unit TCU fully closes the linear valve 106 so as to shut off the second supply oil passage 104b. At this time, the circuit state of the hydraulic circuit 100a is as illustrated in FIG. 4. Hereinafter, the state of the hydraulic circuit 100a illustrated in FIG. 4 will be referred to as a parking circuit state.

In this parking circuit state, the hydraulic oil that is discharged from the pump 102 is delivered as indicated by solid arrows and bold lines. In detail, in the parking circuit state, the linear valve 106 is fully closed, and a supply of the hydraulic oil to the downstream side of the linear valve 106 in the second supply oil passage 104b is stopped.

Meanwhile, the hydraulic oil is supplied to the pilot oil passage 154. However, since the first control valve 160 is held at the close position, a supply of the pilot pressure to the pilot chamber 110b is stopped. As a result, the first switching valve 110 is held at the illustrated initial position by the urging force of the spring 110d. Similarly, since the second control valve 170 is held at the close position, a supply of the pilot pressure to the pilot chamber 120b is stopped. As a result, the second switching valve 120 is held at the illustrated initial position by the urging force of the spring 120d.

In a state where the first switching valve 110 is held at the initial position, the port d is blocked from the other ports by the land portion of the spool valve 110a. Accordingly, although the hydraulic oil that is supplied to the first supply oil passage 104a is delivered to the first switching valve 110 via the ports k, m of the second switching valve 120, the third coupling oil passage 136, and the port d, the hydraulic oil is not supplied to any of the supply targets (the forward clutch FWC, the reverse brake REB, and the hydraulic chamber 22b).

In the parking circuit state of the hydraulic circuit 100a, as indicated by broken arrows and bold broken lines in the drawing, the hydraulic oil is recirculated into the tank T from the supply targets (the forward clutch FWC, the reverse brake REB, and the hydraulic chamber 22b). In detail, in the state where the first switching valve 110 is held at the initial position, the ports a, c communicate with each other, the ports e, f communicate with each other, and the ports g, h communicate with each other. In a state where the second switching valve 120 is held at the initial position, the ports n, p communicate with each other, and the ports s, t communicate with each other.

In this way, the hydraulic chamber 22b communicates with the drain oil passage 142 via the actuator oil passage 150, the first switching valve 110, the first coupling oil passage 132, and the second switching valve 120. Accordingly, the piston 24 is held at the position where the piston 24 moves most to the hydraulic chamber 22b side, and the parking lock mechanism 1 is held in the restriction state (see FIGS. 1A and 1B).

Note that, in the parking circuit state, the linear valve 106 is in the fully closed state, and the downstream side thereof in the second supply oil passage 104b is coupled to the tank passage 108. In this way, the hydraulic oil in the actuation chamber 34a is recirculated into the tank T via the transmission oil passage 152, the second supply oil passage 104b, the linear valve 106, and the tank passage 108.

The reverse brake REB communicates with the drain oil passage 142 via the actuator oil passage 148 and the first switching valve 110. In this way, the reverse brake REB is brought into a disengaged state. The forward clutch FWC communicates with the drain oil passage 142 via the actuator oil passage 146, the first switching valve 110, the fourth coupling oil passage 138, and the second switching valve 120. In this way, the forward clutch FWC is brought into a disengaged state.

In the drain oil passage 142, the two pressure holding valves 144 are provided in parallel. Accordingly, in a state where the forward clutch FWC and the reverse brake REB are disengaged, the actuator oil passage 146, the actuator oil passage 148, and the drain oil passage 142 are held at a set pressure of each of the pressure holding valves 144. Since the hydraulic circuit 100a is held at the predetermined set pressure, just as described, responsiveness at the time when the shift position of the shift lever is switched from the parking range to the drive range or a reverse range can be improved.

Figure 5:
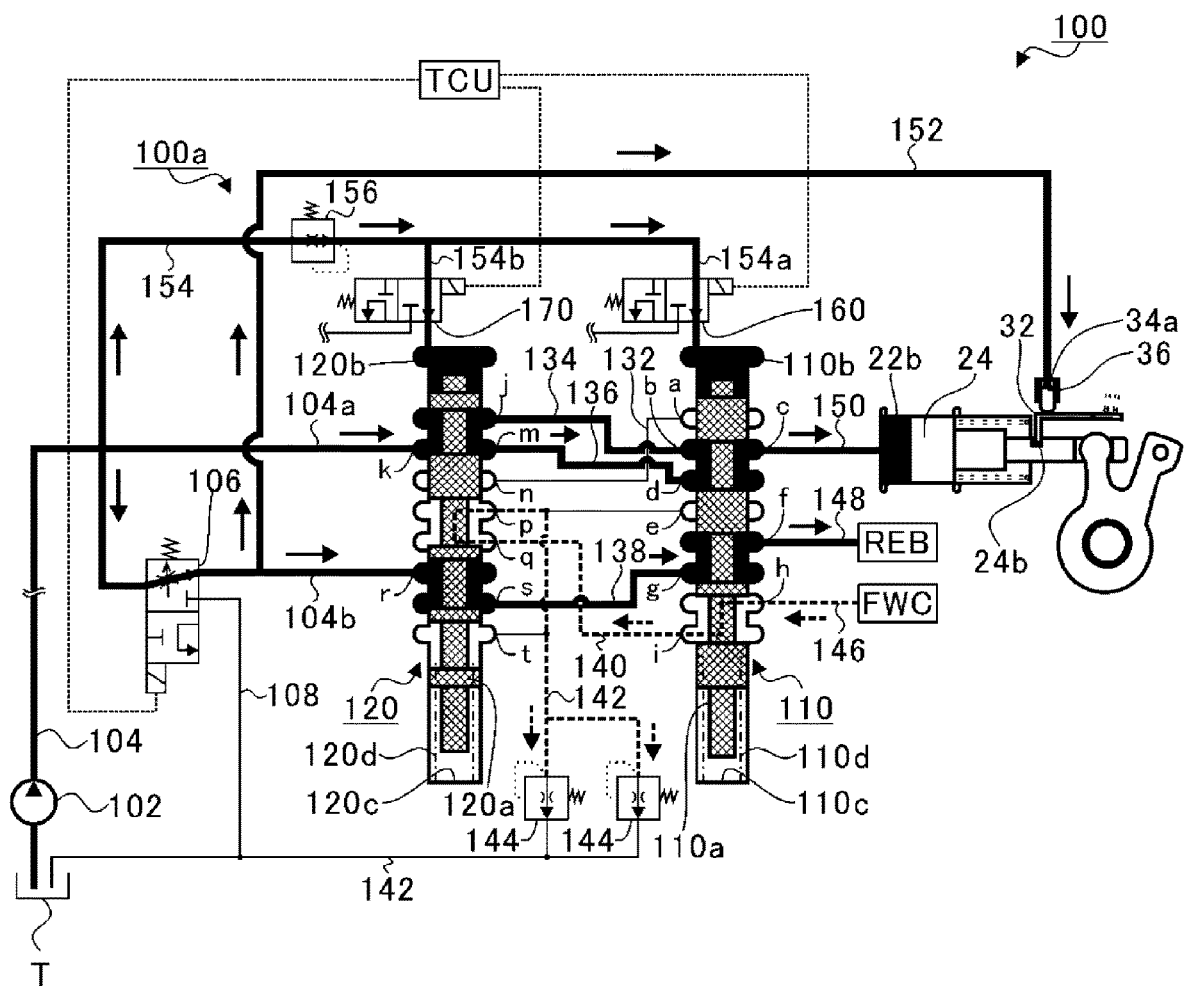
FIG. 5 is a view of a circuit state of the shift control device that corresponds to a reverse range.

FIG. 5 is a view of a circuit state of the shift control device 100 that corresponds to the reverse range. In the case where the shift position of the shift lever is in the reverse range, the transmission control unit TCU energizes the first control valve 160 and the second control valve 170 and holds the first control valve 160 and the second control valve 170 at the illustrated open positions. In addition, the transmission control unit TCU calculates the required hydraulic pressure for each of the hydraulic oil supply targets and controls the opening degree of the linear valve 106 in accordance with the calculation result. At this time, the circuit state of the hydraulic circuit 100a is as illustrated in FIG. 5. Hereinafter, the state of the hydraulic circuit 100a illustrated in FIG. 5 will be referred to as a reverse circuit state.

In this reverse circuit state, the hydraulic oil that is discharged from the pump 102 is delivered as indicated by solid arrows and bold lines. In detail, in the reverse circuit state, the linear valve 106 controls the pressure, and the hydraulic oil is supplied to the downstream side of the linear valve 106 in the second supply oil passage 104b. The hydraulic oil in the second supply oil passage 104b is supplied to the actuation chamber 34a via the transmission oil passage 152. The hydraulic oil in the second supply oil passage 104b is also supplied to the second switching valve 120 from the port r.

The first control valve 160 is held at the open position, and the pilot pressure is applied to the pilot chamber 110b. As a result, the first switching valve 110 is held at the switch position against the urging force of the spring 110d. Similarly, the second control valve 170 is held at the open position, and the pilot pressure is applied to the pilot chamber 120b. As a result, the second switching valve 120 is held at the switch position against the urging force of the spring 120d.

In the state where the first switching valve 110 is held at the switch position, the ports b, c, d communicate with each other, and the ports f, g communicate with each other. In the state where the second switching valve 120 is held at the switch position, the ports j, k, m communicate with each other, and the ports r, s communicate with each other. Accordingly, the hydraulic oil that is supplied to the first supply oil passage 104a is supplied to the hydraulic chamber 22b via the ports k, j, m of the second switching valve 120, the second coupling oil passage 134, the third coupling oil passage 136, the ports b, d, c of the first switching valve 110, and the actuator oil passage 150.

In this way, the piston 24 moves in a right direction in the drawing as illustrated, and the parking lock mechanism 1 is held in the release state (see FIGS. 2A and 2B). At this time, as described above, the hydraulic oil is supplied to the actuation chamber 34a. Accordingly, the holding pin 32 is pressed by the holding member 36 and is brought into a locked state where the holding pin 32 is fitted to the locking groove 24b.

In this locked state, the movement of the piston 24 is limited, and thus the parking lock mechanism 1 is not switched from the release state to the restriction state. In other words, the shift control device 100 has a fail-safe function that prevents erroneous actuation to switch the parking lock mechanism 1 from the release state to the restriction state during travel of the vehicle.

In the reverse circuit state of the hydraulic circuit 100a, the hydraulic oil that is supplied to the second supply oil passage 104b is supplied to the reverse brake REB via the ports r, s of the second switching valve 120, the fourth coupling oil passage 138, the ports g, f of the first switching valve 110, and the actuator oil passage 148. In this way, the reverse brake REB is engaged, and the vehicle can make reverse travel.

In the reverse circuit state of the hydraulic circuit 100a, as indicated by broken arrows and bold broken lines in the drawing, the hydraulic oil is recirculated into the tank T from the forward clutch FWC. In detail, in the state where the first switching valve 110 is held at the switch position, the ports h, i communicate with each other. In the state where the second switching valve 120 is held at the switch position, the ports p, q communicate with each other. Accordingly, the forward clutch FWC communicates with the drain oil passage 142 via the actuator oil passage 146, the first switching valve 110, the fifth coupling oil passage 140, and the second switching valve 120. In this way, the forward clutch FWC is brought into a disengaged state.

Note that, also in this state, the actuator oil passage 146 and the drain oil passage 142 are held at the set pressure of each of the pressure holding valves 144. Thus, the responsiveness at the time when the shift position of the shift lever is switched from the reverse range to the drive range can be improved.

Figure 6:
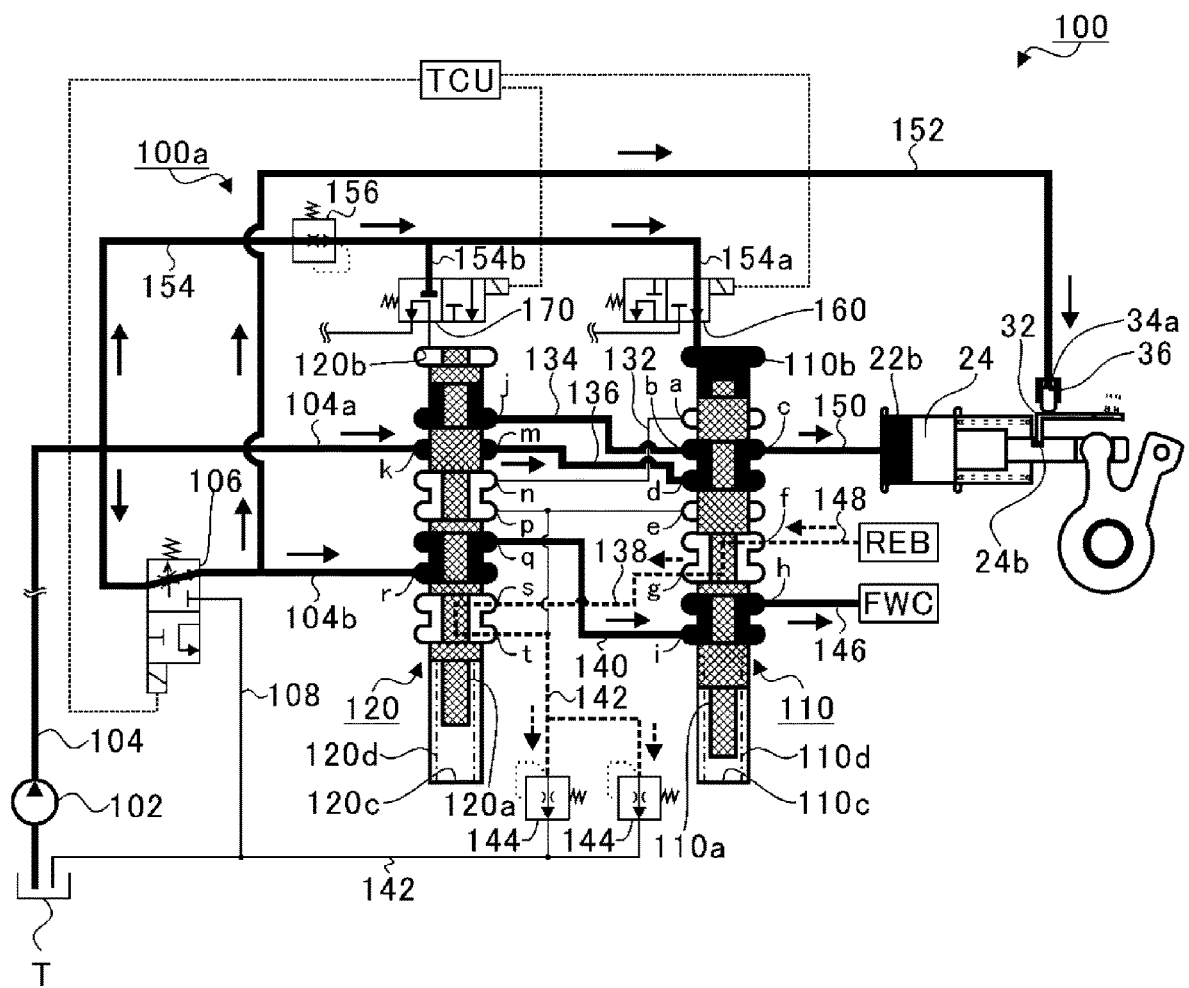
FIG. 6 is a view of a first circuit state of the shift control device that corresponds to a drive range.

FIG. 6 is a view of a first circuit state of the shift control device 100 that corresponds to the drive range. In the case where the shift position of the shift lever is in the drive range, the transmission control unit TCU energizes the first control valve 160 and holds the first control valve 160 at the illustrated open position while controlling the second control valve 170 to be unenergized and holding the second control valve 170 at the illustrated close position. In addition, the transmission control unit TCU calculates the required hydraulic pressure for each of the hydraulic oil supply targets and controls the opening degree of the linear valve 106 in accordance with the calculation result. At this time, the circuit state of the hydraulic circuit 100a is as illustrated in FIG. 6. Hereinafter, the state of the hydraulic circuit 100a illustrated in FIG. 6 will be referred to as a first drive circuit state.

In this first drive circuit state, the hydraulic oil that is discharged from the pump 102 is delivered as indicated by solid arrows and bold lines. In detail, in the first drive circuit state, the linear valve 106 controls the pressure, and the hydraulic oil is supplied to the downstream side of the linear valve 106 in the second supply oil passage 104b. The hydraulic oil in the second supply oil passage 104b is supplied to the actuation chamber 34a via the transmission oil passage 152. The hydraulic oil in the second supply oil passage 104b is also supplied to the second switching valve 120 from the port r.

The first control valve 160 is held at the open position, and the pilot pressure is applied to the pilot chamber 110b. As a result, the first switching valve 110 is held at the switch position against the urging force of the spring 110d. Meanwhile, the second control valve 170 is held at the close position, and the pilot pressure is not applied to the pilot chamber 120b. As a result, the second switching valve 120 is held at the illustrated initial position by the urging force of the spring 120d.

In the state where the first switching valve 110 is held at the switch position, the ports b, c, d communicate with each other, and the ports h, i communicate with each other. In addition, in the state where the second switching valve 120 is held at the initial position, the ports k, m communicate with each other, and the ports q, r communicate with each other. Accordingly, the hydraulic oil that is supplied to the first supply oil passage 104a is supplied to the hydraulic chamber 22b via the ports k, m of the second switching valve 120, the third coupling oil passage 136, the ports d, c of the first switching valve 110, and the actuator oil passage 150.

In this way, the piston 24 is projected as illustrated, and the parking lock mechanism 1 is held in the release state (see FIGS. 2A and 2B). At this time, as described above, the hydraulic oil is supplied to the actuation chamber 34a. Accordingly, the holding pin 32 is pressed by the holding member 36 and is brought into a locked state where the holding pin 32 is fitted to the locking groove 24b.

In the first drive circuit state of the hydraulic circuit 100a, the hydraulic oil that is supplied to the second supply oil passage 104b is supplied to the forward clutch FWC via the ports r, q of the second switching valve 120, the fifth coupling oil passage 140, the ports i, h of the first switching valve 110, and the actuator oil passage 146. In this way, the forward clutch FWC is engaged, and the vehicle can travel forward.

In the first drive circuit state of the hydraulic circuit 100a, as indicated by broken arrows and bold broken lines in the drawing, the hydraulic oil is recirculated into the tank T from the reverse brake REB. In detail, in the state where the first switching valve 110 is held at the switch position, the ports f, g communicate with each other. In the state where the second switching valve 120 is held at the initial position, the ports s, t communicate with each other. Accordingly, the reverse brake REB communicates with the drain oil passage 142 via the actuator oil passage 148, the first switching valve 110, the fourth coupling oil passage 138, and the second switching valve 120. In this way, the reverse brake REB is brought into a disengaged state.

Note that, also in this state, the actuator oil passage 148 and the drain oil passage 142 are held at the set pressure of each of the pressure holding valves 144. Thus, the responsiveness at the time when the shift position of the shift lever is switched from the drive range to the reverse range can be improved.

Figure 7:
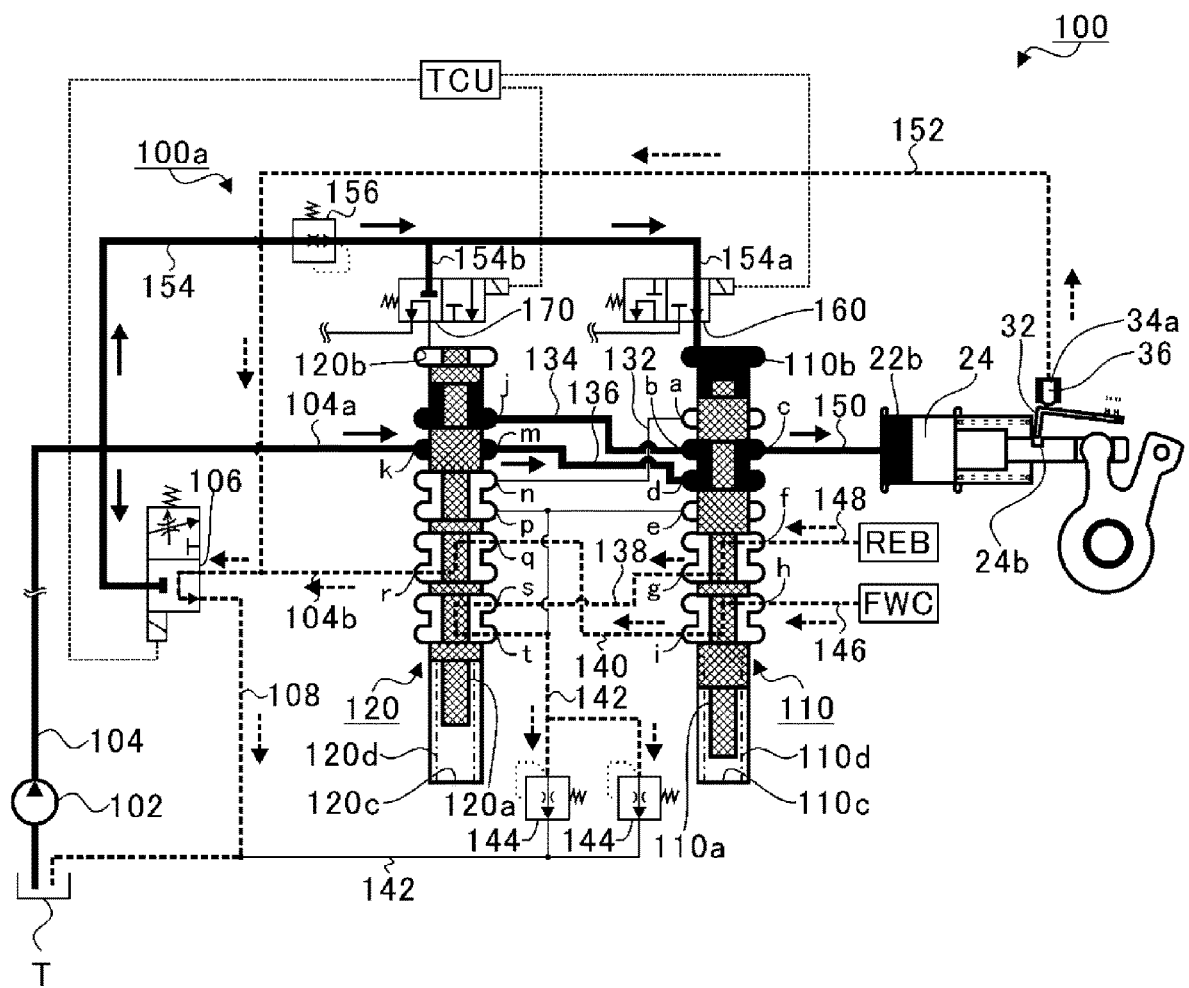
FIG. 7 is a view of a first circuit state of the shift control device that corresponds to a neutral range.

FIG. 7 is a view of a first circuit state of the shift control device 100 that corresponds to a neutral range. In the case where the shift position of the shift lever is in the neutral range, the transmission control unit TCU energizes the first control valve 160 and holds the first control valve 160 at the illustrated open position while controlling the second control valve 170 to be unenergized and holding the second control valve 170 at the illustrated close position. In addition, the transmission control unit TCU fully closes the linear valve 106 so as to shut off the second supply oil passage 104b. At this time, the circuit state of the hydraulic circuit 100a is as illustrated in FIG. 7. Hereinafter, the state of the hydraulic circuit 100a illustrated in FIG. 7 will be referred to as a first neutral circuit state.

In the cases where the shift position of the shift lever is in the neutral range and where the shift position of the shift lever is in the drive range, the energized conditions of the first control valve 160 and the second control valve 170 are the same, and only a controlled condition of the linear valve 106 differs. Thus, the first neutral circuit state is the same as the first drive circuit state described above in terms of the positions (the states) of the first switching valve 110 and the second switching valve 120 and only differs from the first drive circuit state in a point that the linear valve 106 is in the fully closed state.

In this first neutral circuit state, the hydraulic oil that is discharged from the pump 102 is delivered as indicated by solid arrows and bold lines. In detail, in the first neutral circuit state, the linear valve 106 is fully closed, and the supply of the hydraulic oil to the downstream side of the linear valve 106 in the second supply oil passage 104b is stopped.

The first control valve 160 is held at the open position, and the pilot pressure is applied to the pilot chamber 110b. As a result, the first switching valve 110 is held at the switch position against the urging force of the spring 110d. Meanwhile, the second control valve 170 is held at the close position, and the pilot pressure is not applied to the pilot chamber 120b. As a result, the second switching valve 120 is held at the illustrated initial position by the urging force of the spring 120d.

In the state where the first switching valve 110 is held at the switch position, the ports b, c, d communicate with each other. In addition, in the state where the second switching valve 120 is held at the initial position, the ports k, m communicate with each other. Accordingly, the hydraulic oil that is supplied to the first supply oil passage 104a is supplied to the hydraulic chamber 22b via the ports k, m of the second switching valve 120, the third coupling oil passage 136, the ports d, c of the first switching valve 110, and the actuator oil passage 150.

In this way, the piston 24 is projected as illustrated, and the parking lock mechanism 1 is held in the release state (see FIGS. 2A and 2B). Note that, in the first neutral circuit state, the linear valve 106 is in the fully closed state, and the downstream side thereof in the second supply oil passage 104b is coupled to the tank passage 108. In this way, the hydraulic oil in the actuation chamber 34a is recirculated into the tank T via the transmission oil passage 152, the second supply oil passage 104b, the linear valve 106, and the tank passage 108. Accordingly, the holding member 36 is accommodated in the actuation chamber 34a, and the holding pin 32 is brought into an unlocked state where the holding pin 32 is detached from the locking groove 24b.

In the first neutral circuit state of the hydraulic circuit 100a, as indicated by broken arrows and bold broken lines in the drawing, the hydraulic oil is recirculated into the tank T from the reverse brake REB. In detail, in the state where the first switching valve 110 is held at the switch position, the ports f, g communicate with each other. In the state where the second switching valve 120 is held at the initial position, the ports s, t communicate with each other. Accordingly, the reverse brake REB communicates with the drain oil passage 142 via the actuator oil passage 148, the first switching valve 110, the fourth coupling oil passage 138, and the second switching valve 120. In this way, the reverse brake REB is brought into a disengaged state.

In addition, in the state where the first switching valve 110 is held at the switch position, the ports h, i communicate with each other. In the state where the second switching valve 120 is held at the initial position, the ports q, r communicate with each other. Accordingly, the forward clutch FWC communicates with the drain oil passage 142 via the actuator oil passage 146, the first switching valve 110, the fifth coupling oil passage 140, the second switching valve 120, the second supply oil passage 104b, the linear valve 106, and the tank passage 108. In this way, the forward clutch FWC is brought into a disengaged state.

As it has been described so far, in the shift control device 100 of the present example, when the shift position of the shift lever is switched to the parking range, the circuit state of the hydraulic circuit 100a is switched to the parking circuit state in FIG. 4. Similarly, when the shift position of the shift lever is switched to the reverse range, the drive range, and the neutral range, the circuit state of the hydraulic circuit 100a is respectively switched to the reverse circuit state in FIG. 5, the first drive circuit state in FIG. 6, and the first neutral circuit state in FIG. 7.

Each of the above circuit states is switched when the transmission control unit TCU switches the positions or the states of the first switching valve 110, the second switching valve 120, and the linear valve 106 in accordance with the shift position of the shift lever. That is, the shift control device 100 is of the shift-by-wire type in which the circuit state of the hydraulic circuit 100a is electrically switched.

In the shift control device of such a shift-by-wire type, there is a case where the first switching valve 110 or the second switching valve 120 cannot be switched due to malfunction of the first control valve 160 or the second control valve 170, which prevents evacuation of the vehicle to a safe place. In view of the above, the shift control device 100 has a second drive circuit state of the hydraulic circuit 100a. For instance, in the case where the hydraulic circuit 100a cannot be switched to the first drive circuit state due to the malfunction of the first control valve 160 or the second control valve 170, the transmission control unit TCU switches the hydraulic circuit 100a to the second drive circuit state.

Figure 8:
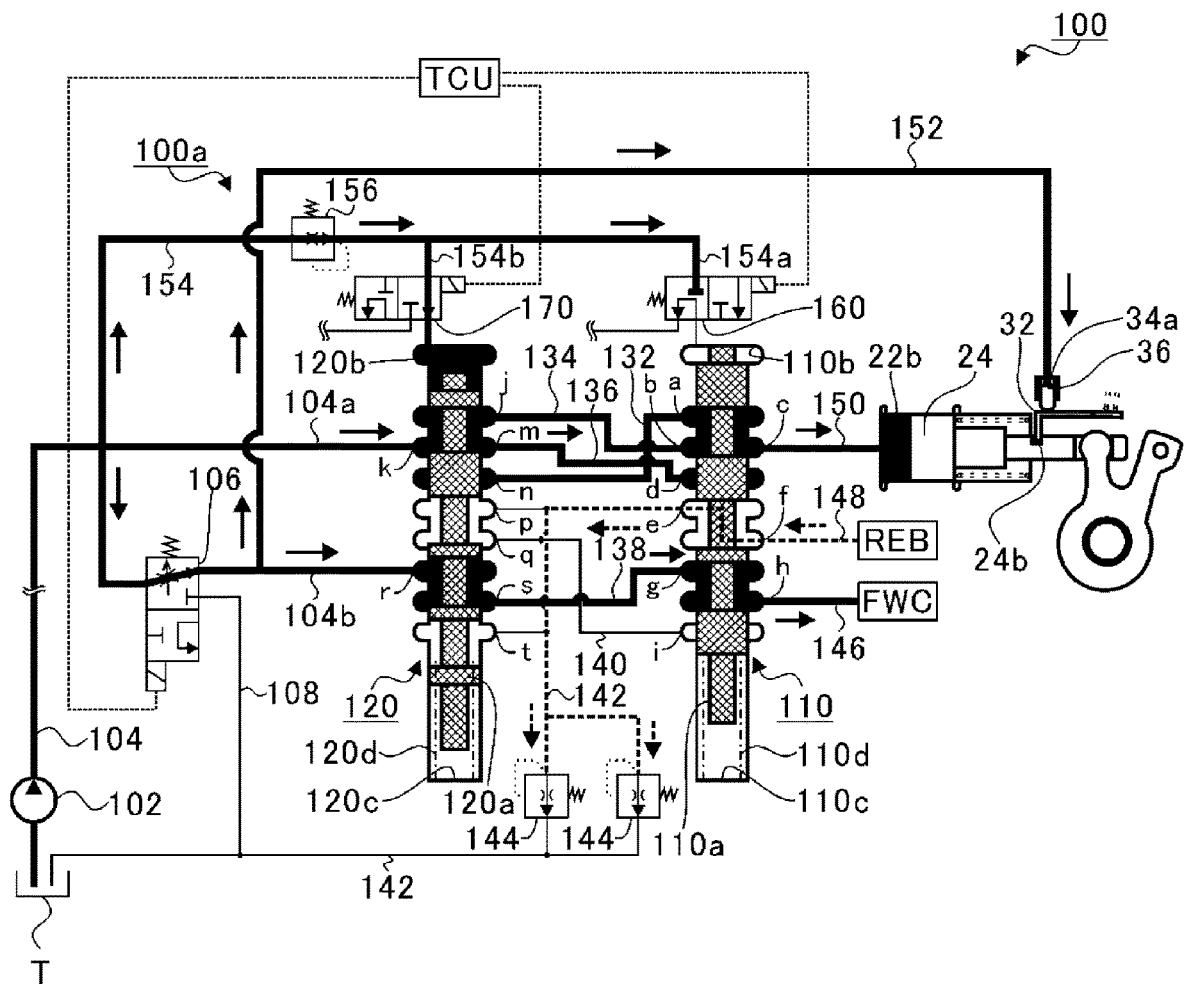
FIG. 8 is a view of a second circuit state of the shift control device that corresponds to the drive range.

FIG. 8 is a view of the second circuit state of the shift control device 100 that corresponds to the drive range. For instance, in the case where the hydraulic circuit 100a cannot be switched to the first drive circuit state despite a fact that the shift position of the shift lever is in the drive range, the transmission control unit TCU controls the first control valve 160 to be unenergized and holds the first control valve 160 at the illustrated close position while energizing the second control valve 170 and holding the second control valve 170 at the illustrated open position. In addition, the transmission control unit TCU calculates the required hydraulic pressure for each of the hydraulic oil supply targets and controls the opening degree of the linear valve 106 in accordance with the calculation result. At this time, the circuit state of the hydraulic circuit 100a is as illustrated in FIG. 8. Hereinafter, the state of the hydraulic circuit 100a illustrated in FIG. 8 will be referred to as the second drive circuit state.

In this second drive circuit state, the hydraulic oil that is discharged from the pump 102 is delivered as indicated by solid arrows and bold lines. In detail, in the second drive circuit state, the linear valve 106 controls the pressure, and the hydraulic oil is supplied to the downstream side of the linear valve 106 in the second supply oil passage 104b. The hydraulic oil in the second supply oil passage 104b is supplied to the actuation chamber 34a via the transmission oil passage 152. The hydraulic oil in the second supply oil passage 104b is also supplied to the second switching valve 120 from the port r.

The first control valve 160 is held at the close position, and the pilot pressure is not applied to the pilot chamber 110b. As a result, the first switching valve 110 is held at the illustrated initial position by the urging force of the spring 110d. Meanwhile, the second control valve 170 is held at the open position, and the pilot pressure is applied to the pilot chamber 120b. As a result, the second switching valve 120 is held at the switch position against the urging force of the spring 120d.

In addition, in the state where the first switching valve 110 is held at the initial position, the ports b, c communicate with each other, and the ports g, h communicate with each other. In the state where the second switching valve 120 is held at the switch position, the ports j, k communicate with each other, and the ports r, s communicate with each other. Accordingly, the hydraulic oil that is supplied to the first supply oil passage 104a is supplied to the hydraulic chamber 22b via the ports k, j of the second switching valve 120, the second coupling oil passage 134, the ports b, c of the first switching valve 110, and the actuator oil passage 150.

In this way, the piston 24 is projected as illustrated, and the parking lock mechanism 1 is held in the release state (see FIGS. 2A and 2B). At this time, as described above, the hydraulic oil is supplied to the actuation chamber 34a. Accordingly, the holding pin 32 is pressed by the holding member 36 and is brought into a locked state where the holding pin 32 is fitted to the locking groove 24b.

In the second drive circuit state of the hydraulic circuit 100a, the hydraulic oil that is supplied to the second supply oil passage 104b is supplied to the forward clutch FWC via the ports r, s of the second switching valve 120, the fourth coupling oil passage 138, the ports g, h of the first switching valve 110, and the actuator oil passage 146. In this way, the forward clutch FWC is engaged, and the vehicle can travel forward.

In the second drive circuit state of the hydraulic circuit 100a, as indicated by broken arrows and bold broken lines in the drawing, the hydraulic oil is recirculated into the tank T from the reverse brake REB. In detail, in the state where the first switching valve 110 is held at the initial position, the ports f, e communicate with each other. Accordingly, the reverse brake REB communicates with the drain oil passage 142 via the actuator oil passage 148 and the first switching valve 110. In this way, the reverse brake REB is brought into a disengaged state.

Note that, also in this state, the actuator oil passage 148 and the drain oil passage 142 are held at the set pressure of each of the pressure holding valves 144. Thus, the responsiveness at the time when the shift position of the shift lever is switched from the drive range to the reverse range can be improved.

There is a case where the vehicle cannot be pulled over safely when the first switching valve 110 or the second switching valve 120 cannot be switched due to the malfunction of the first control valve 160 or the second control valve 170. In view of the above, the shift control device 100 has a second neutral circuit state of the hydraulic circuit 100a. For instance, in the case where the hydraulic circuit 100a cannot be switched to the first neutral circuit state due to the malfunction of the first control valve 160 or the second control valve 170, the transmission control unit TCU switches the hydraulic circuit 100a to the second neutral circuit state.

Figure 9:
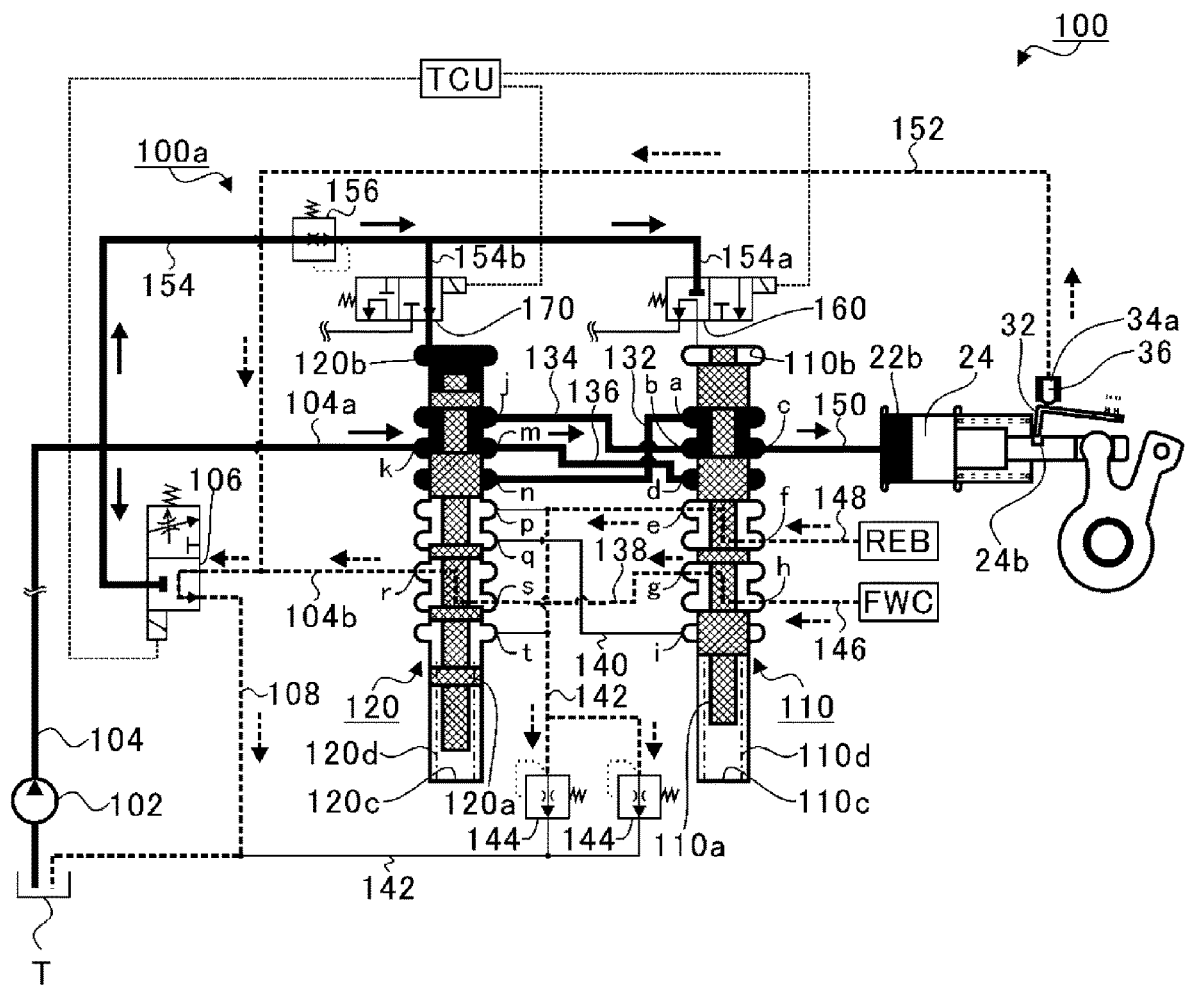
FIG. 9 is a view of a second circuit state of the shift control device that corresponds to the neutral range.

FIG. 9 is a view of a second circuit state of the shift control device 100 that corresponds to the neutral range. For instance, in the case where the hydraulic circuit 100a cannot be switched to the first neutral circuit state despite a fact that the shift position of the shift lever is in the neutral range, the transmission control unit TCU controls the first control valve 160 to be unenergized and holds the first control valve 160 at the illustrated close position while energizing the second control valve 170 and holding the second control valve 170 at the illustrated open position. In addition, the transmission control unit TCU fully closes the linear valve 106 so as to shut off the second supply oil passage 104b. At this time, the circuit state of the hydraulic circuit 100a is as illustrated in FIG. 9. Hereinafter, the state of the hydraulic circuit 100a illustrated in FIG. 9 will be referred to as the second neutral circuit state.

The second neutral circuit state is the same as the second drive circuit state described above in terms of the positions (the states) of the first switching valve 110 and the second switching valve 120 and only differs from the second drive circuit state in the point that the linear valve 106 is in the fully closed state.

In this second neutral circuit state, the hydraulic oil that is discharged from the pump 102 is delivered as indicated by solid arrows and bold lines. In detail, in the second neutral circuit state, the linear valve 106 is fully closed, and the supply of the hydraulic oil to the downstream side of the linear valve 106 in the second supply oil passage 104b is stopped.

The first control valve 160 is held at the close position, and the pilot pressure is not applied to the pilot chamber 110b. As a result, the first switching valve 110 is held at the illustrated initial position by the urging force of the spring 110d. Meanwhile, the second control valve 170 is held at the open position, and the pilot pressure is applied to the pilot chamber 120b. As a result, the second switching valve 120 is held at the switch position against the urging force of the spring 120d.

In the state where the first switching valve 110 is held at the initial position, the ports b, c communicate with each other. In addition, in the state where the second switching valve 120 is held at the switch position, the ports j, k communicate with each other. Accordingly, the hydraulic oil that is supplied to the first supply oil passage 104a is supplied to the hydraulic chamber 22b via the ports k, j of the second switching valve 120, the second coupling oil passage 134, the ports b, c of the first switching valve 110, and the actuator oil passage 150.

In this way, the piston 24 is projected as illustrated, and the parking lock mechanism 1 is held in the release state (see FIGS. 2A and 2B). Note that, in the second neutral circuit state, the linear valve 106 is in the fully closed state, and the downstream side thereof in the second supply oil passage 104b is coupled to the tank passage 108. In this way, the hydraulic oil in the actuation chamber 34a is recirculated into the tank T via the transmission oil passage 152, the second supply oil passage 104b, the linear valve 106, and the tank passage 108. Accordingly, the holding member 36 is accommodated in the actuation chamber 34a, and the holding pin 32 is brought into an unlocked state where the holding pin 32 is detached from the locking groove 24b.

In the second neutral circuit state of the hydraulic circuit 100a, as indicated by broken arrows and bold broken lines in the drawing, the hydraulic oil is recirculated into the tank T from the reverse brake REB. In detail, in the state where the first switching valve 110 is held at the initial position, the ports f, e communicate with each other. Accordingly, the reverse brake REB communicates with the drain oil passage 142 via the actuator oil passage 148 and the first switching valve 110. In this way, the reverse brake REB is brought into a disengaged state.

In the state where the first switching valve 110 is held at the initial position, the ports g, h communicate with each other. In the state where the second switching valve 120 is held at the switch position, the ports r, s communicate with each other. Accordingly, the forward clutch FWC communicates with the drain oil passage 142 via the actuator oil passage 146, the first switching valve 110, the fourth coupling oil passage 138, the second switching valve 120, the second supply oil passage 104b, the linear valve 106, and the tank passage 108. In this way, the forward clutch FWC is brought into a disengaged state.

As it has been described so far, according to the shift control device 100 of the present example, the hydraulic circuit 100a is configured to be switchable between the first drive circuit state and the second drive circuit state. In this way, even when the malfunction occurs to the first control valve 160 or the second control valve 170, the vehicle can travel to the safe place.

In addition, according to the shift control device 100 of the present example, the hydraulic circuit 100a is configured to be switchable between the first neutral circuit state and the second neutral circuit state. In this way, even when the malfunction occurs to the first control valve 160 or the second control valve 170, the vehicle can be pulled over safely.

Furthermore, according to the shift control device 100 of the present example, the pressure holding valves 144, each of which holds the pressure of the drain oil passage 142 at the predetermined pressure, are provided. In this way, the hydraulic pressures of the actuator oil passage 146, the actuator oil passage 148, and further the hydraulic oil supply targets are held to be equal to or higher than the predetermined pressure. Thus, the responsiveness can be improved.

In particular, in the present example, the pressure holding valves 144 are provided in parallel in the drain oil passage 142. Thus, even when one of the pressure holding valves 144 is not opened due to malfunction, the hydraulic oil can reliably be drained.

Although the preferred example of the present invention has been described with reference to the accompanying drawings, the present invention is not limited to such an example. Provided a person has ordinary knowledge in the technical field to which the example of the present invention pertains, within the scope of the technical idea described in the claims, the example of the present invention is intended to cover various modifications and applications, and such modifications and applications are intended to fall within the technical scope of the present invention.

The circuit configuration of the hydraulic circuit 100a in the above example is merely one instance, and the design thereof can appropriately be modified. For instance, in the above example, the first switching valve 110 is held at the switch position when the first control valve 160 is in the energized state, and the first switching valve 110 is held at the initial position when the first control valve 160 is in the unenergized state. In addition, the second switching valve 120 is held at the switch position when the second control valve 170 is in the energized state, and the second switching valve 120 is held at the initial position when the second control valve 170 is in the unenergized state. However, for instance, the first switching valve 110 (the second switching valve 120) may be held at the initial position when the first control valve 160 (the second control valve 170) is in the energized state, and the first switching valve 110 (the second switching valve 120) may be held at the switch position when the first control valve 160 (the second control valve 170) is in the unenergized state.

In the above example, the hydraulic circuit 100a includes the linear valve 106 that can be switched between the opened state where the pump 102 can be coupled to the forward clutch FWC and the reverse brake REB and the closed state where the pump 102 cannot be coupled to the forward clutch FWC and the reverse brake REB. In addition, the hydraulic circuit 100a includes the first switching valve 110 and the second switching valve 120, each of which can be switched between the initial position and the switch position. In the first drive circuit state and the second drive circuit state where the positions of the first switching valve 110 and the second switching valve 120 are the same but the opened/closed state of the linear valve 106 differs, the pump 102 is coupled to the same forward clutch FWC in the continuously variable transmission.

However, a hydraulic circuit that is provided with multiple actuation valves and a control unit that switches positions or states of each of the multiple actuation valves in accordance with the shift position of the shift lever may be provided. In multiple circuit states where the position or the state of at least one of the multiple actuation valves differs, the hydraulic circuit may couple the hydraulic oil supply source to the same travel actuator in the continuously variable transmission. Thus, although the first switching valve 110, the second switching valve 120, and the linear valve 106 are provided as the multiple actuation valves in the above example, the number and the configurations of the actuation valves are not limited to those in the above example. For instance, each of the first switching valve 110 and the second switching valve 120 may be switched among three or more positions, and the linear valve 106 may be constructed of a valve body that opens/closes the circuit.

In the above example, the first drive circuit state and the second drive circuit state are respectively provided as a first travel circuit state and a second travel circuit state. However, for instance, a first reverse circuit state and a second reverse circuit state may respectively be provided as the first travel circuit state and the second travel circuit state. That is, the travel actuator is not limited to the forward clutch FWC but may be the reverse brake REB.

In the above example, the first neutral circuit state and the second neutral circuit state are respectively provided as a first stop circuit state and a second stop circuit state. However, for instance, a first parking circuit state and a second parking circuit state may respectively be provided as the first stop circuit state and the second stop circuit state. Furthermore, only one stop circuit state may be provided.

In the above example, the shift control device 100 controls the parking lock mechanism 1. However, the parking lock mechanism 1 is not an essential component.

In the above example, the description has been made on the shift operation device in which the range switching operation is performed by using the shift lever. However, the range switching operation may be performed by using a push-button, a dial, a touchscreen, or the like, for instance, and the configuration of the shift operation device is not limited to that described in the above example.

In the above example, the description has been made on the continuously variable transmission. However, the present invention is also applicable to other automatic transmissions such as a planetary AT.

According to the present invention, the vehicle can reliably be evacuated to the safe place.

The present invention can be used for the shift control device used for the vehicle.

The invention claimed is:

1. A shift control device comprising:
 a hydraulic circuit provided with multiple actuation valves; and
 a control unit configured to switch positions or states of each of the actuation valves in accordance with a shift position command by a shift operation device,
 wherein the hydraulic circuit is configured to couple a hydraulic oil supply source to one of travel actuators in an automatic transmission in circuit states where the position or the state of at least one of the actuation valves differs,
 wherein, upon a failure in one of the actuation valves of a change to the state corresponding to the shift position by the hydraulic circuit, the control unit chances the positions or states of an other of the actuation valves to correspond to the shift position and unenergizes the one of the actuation valves.

2. The shift control device according to claim 1, wherein each of the actuation valves are capable of each of the states for the shift operation device.

3. A shift control device comprising:
 a hydraulic circuit provided with actuation valves; and
 a control unit configured to switch positions or states of each of the actuation valves in accordance with a shift position command by a shift operation device,
 wherein the hydraulic circuit is configured to couple a hydraulic oil supply source to one of travel actuators in an automatic transmission in circuit states where the position or the state of at least one of the actuation valves differ,
 wherein the actuation valves include:
  a first switching valve and a second switching valve, each of which is at least switchable between a first position and a second position; and
  a control valve configured to be switched between an opened state where the supply source is capable of being coupled to the travel actuators and a closed state where the supply source cannot be coupled to the travel actuators, and
 wherein the hydraulic circuit couples the supply source to one of the travel actuators in a first travel circuit state where the control valve is in the opened state, where the first switching valve is at the first position, and where the second switching valve is at the second position and in a second travel circuit state where the control valve is in the opened state, where the first switching valve is at the second position, and the second switching valve is at the first position.

4. The shift control device according to claim 3, wherein the hydraulic circuit blocks all of the travel actuators from the supply source in a first stop circuit state where the control valve is in the closed state, where the first switching valve is at the first position, and where the second switching valve is at the second position and in a second stop circuit state where the control valve is in the closed state, where the first switching valve is at the second position, and where the second switching position is at the first state.

5. The shift control device according to claim 3, further comprising:
a first control valve and a second control valve, each of which is configured to be controlled by the control unit and is actuated by energization,
wherein the first switching valve is held at the first position when the first control valve is in an energized state, and the first switching valve is held at the second position when the first control valve is in an unenergized state, and
wherein the second switching valve is held at the first position when the second control valve is in an energized state, and the second switching valve is held at the second position when the second control valve is in an unenergized state.

6. The shift control device according to claim 3, wherein the actuation valves include:
a first switching valve and a second switching valve, each of which is at least switchable between a first position and a second position; and
a control valve configured to be switched between an opened state where the supply source is capable of being coupled to the travel actuators and a closed state where the supply source cannot be coupled to the travel actuators.

7. The shift control device according to claim 3, wherein an opening degree of at least one of the actuation valves is linearly controlled in accordance with a current value where the at least one of the actuation valves are brought into a fully opened state in an unenergized state and maximizes an opening degree of a supply oil passage and, when the current value becomes equal to or greater than a specified value, the at least one of the actuation valves shuts off the supply oil passage, and
wherein, when the supply oil passage is shut off, at this time, the at least one of the actuation valves communicates a downstream side of the at least one of the actuation valves in the supply oil passage with the hydraulic oil supply source.

8. The shift control device according to claim 3, wherein the hydraulic circuit further includes a drain oil passage,
wherein the drain oil passage couples the actuation valves and the hydraulic oil supply source together,
wherein, in the drain oil passage, pressure holding valves are provided in parallel,
wherein, when a pressure of the drain oil passage on an upstream side of the pressure holding valves is lower than a predetermined pressure, the pressure holding valves are held in closed states and block the communication between the hydraulic oil supply source and each oil passage of the oil passages in the hydraulic circuit.

9. The shift control device according to claim 3, wherein the hydraulic circuit further includes a drain oil passage,
wherein the drain oil passage couples the actuation valves and the hydraulic oil supply source together,
wherein, in the drain oil passage, pressure holding valves are provided in parallel,
wherein, when the pressure of the drain oil passage on an upstream side of the pressure holding valves becomes equal to or greater than a predetermined pressure, the pressure holding valves are brought into opened states and communicate between the hydraulic oil supply source and each oil passage of the oil passages in the hydraulic circuit.

10. The shift control device according to claim 3, wherein the hydraulic circuit further includes a drain oil passage,
wherein, in the drain oil passage, pressure holding valves are provided in parallel,
wherein each of the pressure holding valves holds the pressure of the drain oil passage at the predetermined pressure.

11. The shift control device according to claim 10, wherein each of the pressure holding valves includes a one-way valve that only permits a flow of the hydraulic oil in one direction between the actuation valves.

12. The shift control device according to claim 5, further comprising:
a first control valve and a second control valve, each of which is configured to be controlled by the control unit and is actuated by energization,
wherein the first switching valve is held at the first position when the first control valve is in an energized state, and the first switching valve is held at the second position when the first control valve is in an unenergized state, and
wherein the second switching valve is held at the first position when the second control valve is in an energized state, and the second switching valve is held at the second position when the second control valve is in an unenergized state.

13. A shift control device comprising:
a hydraulic circuit provided with multiple actuation valves; and
circuitry configured to switch positions or states of each of the actuation valves in accordance with a shift position command by a shift operation device,
wherein the hydraulic circuit is configured to couple a hydraulic oil supply source to one of travel actuators in an automatic transmission in circuit states where the position or the state of at least one of the actuation valves differs,
wherein, upon a failure in one of the actuation valves of a change to the state corresponding to the shift position by the hydraulic circuit, the circuitry changes the positions or states of an other of the actuation valves to correspond to the shift position and unenergizes the one of the actuation valves.

* * * * *